Sept. 10, 1940.  H. J. BERRY  2,214,449
CUTTING HEAD
Filed Jan. 6, 1939
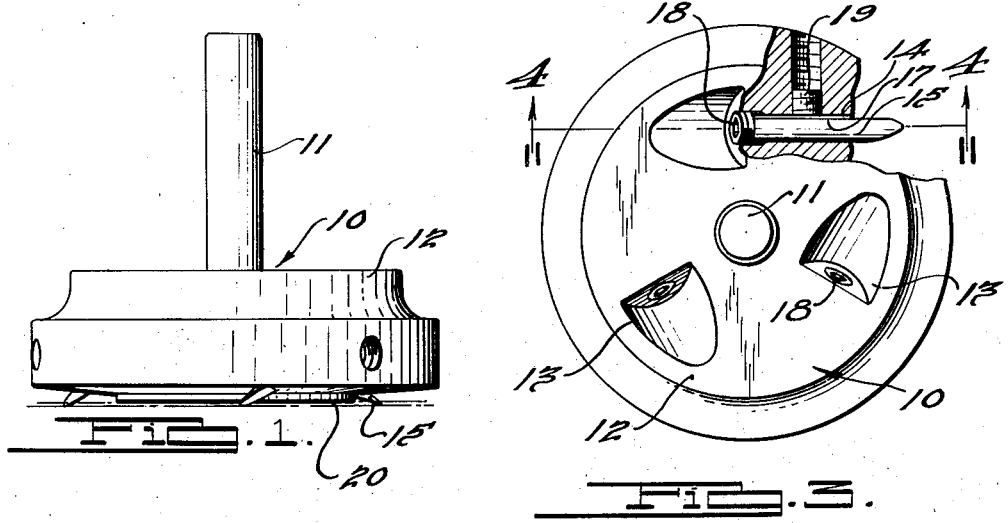
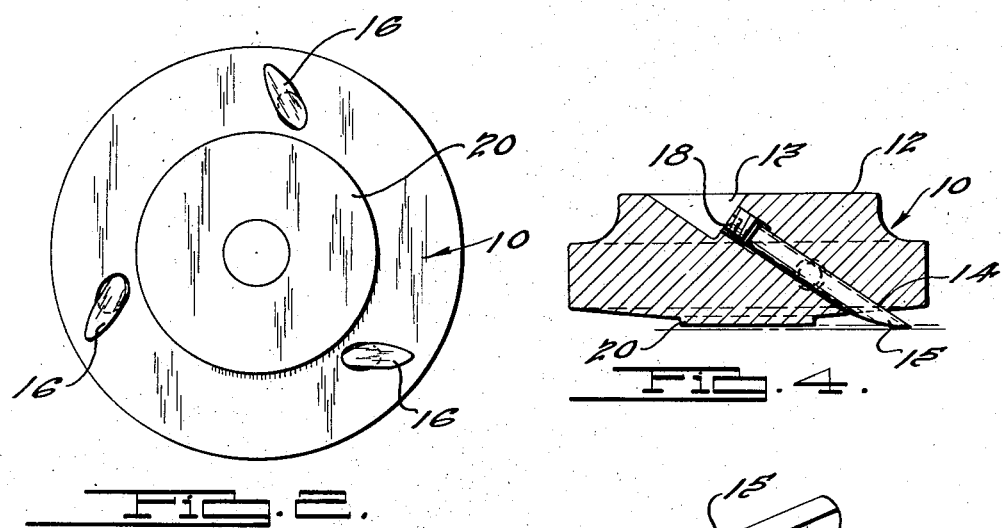
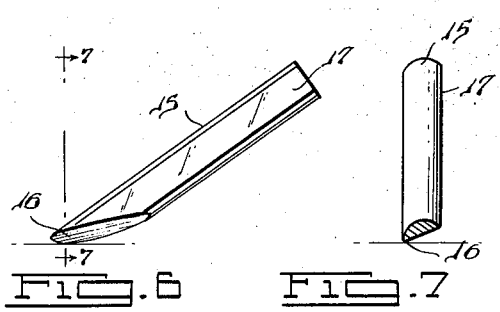
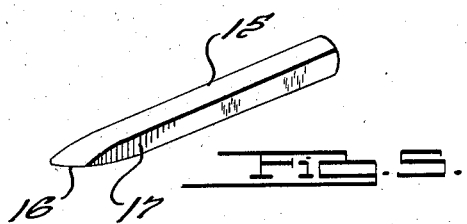
INVENTOR
Henry J. Berry.
BY Oike, Calver & Gray
ATTORNEYS.

Patented Sept. 10, 1940

2,214,449

UNITED STATES PATENT OFFICE 2,214,449

CUTTING HEAD

Henry J. Berry, Detroit, Mich.

Application January 6, 1939, Serial No. 249,582

1 Claim. (Cl. 144—219)

The present invention relates to improvements in cutter heads and particularly to a cutter head of the type commonly referred to as a rotating disk cutter. Such cutters may be used as a disk type planer in which the path of the cutting edge is coincident with the plane of the surface of the work piece. Such cutters are adapted to be driven at relatively high speeds and to produce a cut crosswise of the grain of the work piece for the purpose of producing a uniformly smooth surface thereon. The present invention consists in the construction of the cutter head which enables it to be power driven as for example in a drill press and in which provision is made for regulating the action of the cutting blades on the work piece whereby the surface cut taken on the work piece is in effect a pairing or shaving type of cut which results in the production of a smooth, finished surface thereon.

A principal object of the present invention is to provide a cutter head in which the cutting teeth are carried in a unitary body member in such a manner as to be readily adjustable, the cutting teeth providing a sweeping angular cut on the surface of the work piece.

It is a further object of the present invention to provide a cutter head in which a plurality of cutter blades are adjustably secured in a body member which is provided with a guiding surface adapted to control the action of the cutting blades by a guiding action from the finished surface of the work piece.

It is a further object of the present invention to provide a cutter head in which a plurality of cutting teeth preferably formed of hardened steel rod stock are adjustably secured in a body portion to provide an angular cutting of the surface of the work piece to a predetermined adjustable depth.

A further object of the present invention is to provide a safety type of cutter head in which the body portion is a unitary circular disk free of any extending projections.

Other objects of this invention will appear in the following description and appended claim, reference being had to the accompanying drawing forming a part of this specification wherein like reference characters designate corresponding parts in the several views.

Fig. 1 is a side elevation of a cutter head embodying the present invention.

Fig. 2 is a bottom plan of the cutter head shown in Fig. 1.

Fig. 3 is a top plan of the cutter head shown in Fig. 1 with the parts broken away to show the adjustment of the cutting teeth.

Fig. 4 is a section taken substantially on the line 4—4 in the direction of the arrows of Fig. 3.

Fig. 5 is a view in perspective of one of the cutter blades used in the cutter head of the present invention.

Fig. 6 is a side elevation of one of the cutter blades used in the cutter head of the present invention.

Fig. 7 is a view, partially in section, taken substantially on the line 7—7 of Fig. 6 in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawing and particularly to Fig. 1 the cutter head of the present invention comprises a body 10 which is secured to a spindle 11. The spindle 11 is adapted to be secured in any desired type of tool holder such, for example, as a drill chuck on a drill press (not shown). The body portion 10 is provided with a stepped top portion 12 having a plurality of recesses 13 formed therein. Openings 14 (Figs. 3 and 4) communicate with the recessed portion 13 and with the bottom of the body 10. A plurality of cutter blades 15 are secured in the body member 10 one being secured in each of the openings 14.

As shown in Fig. 5 each of the blades 15 is formed of hardened rod stock which is ground to provide an elliptical cutting surface 16 (see Fig. 2) and a flat edge surface 17 (see Fig. 5). The cutter blades 15 are adjustably secured in the body portion 10 by a set screw 18 which contacts the top portion of the shank of the tool 15 and a set screw 19 which contacts the flat surface 17 of the cutting blades 15.

A guide member 20 is formed integrally with the body portion 10 and is adapted to contact the finished surface of a work piece and to guide the cutting blades in the cutting of the unfinished portion of said surface. The cutting blades 15 are thus guided in their cutting action from the smooth finished portion of the surface of the work piece and this eliminates chattering of the cutter head and the formation of resultant rough surfaces on the work piece.

The depth of the cut made in the surface of the work piece is determined by the vertical adjustment of the cutting blades 15 and this is the function of the two set screws 18 and 19. The cutting angle of the blades 15 on the work piece is determined by the angle of the cutting edge 16 with relation to the flat surface 17 provided on the shank of the cutting blades 15. As is apparent from a consideration of Fig. 3, it will be seen that the set screw 19 contacts the face of the flat surface 17 and thus holds the cutting blades 15 in a predetermined position to provide the desired angularity of the cutting blades relative to the surface of the work piece.

The construction herein shown provides a cutter head which is adapted for high speed operation as, for example, at speeds of approximately 2500 to 5000 R. P. M. The depth of the cut made by the cutting blades 15 may be adjusted by the set screws 18 and 19 and the angularity of the cutting blades relative to the surface of the work piece may be controlled by the contact of the set screw 19 with the flat surface 17 and the fixed angle of the cutting surfaces of the blades relative to the said flat surface 17.

Each of the cutting blades 15 is preferably formed of rod stock such, for example, as drill rod stock, which after it has been cut to provide the desired elliptical cutting surface 16 and the flat side 17 is then hardened. Such a cutting blade is relatively inexpensive to manufacture and gives a long life of service. The blades may be readily removed from and replaced in said cutter head by the construction here shown.

In the embodiment of the invention here shown the set screws 18 and 19 are of the type known as Allen set screws which are adapted to be screw threaded into an opening and which may be adjusted by means of a set screw wrench. Very accurate adjustment of the blades may be made by accurately adjusting the set screws and by using micrometer feeler gauges between the ends of the cutting blades and the surface of the work piece. Once adjusted, the blades will be held in such adjusted position until it is desired to change the adjustment.

The body portion 10 may be formed in any desired manner but preferably is formed as a die casting. Using such a casting the recessed portions 13 and the openings 15 as well as the screw threads may be readily provided and the whole body member will be formed of a metal of uniform density and of a predetermined design. It should be understood, however, that the body member 10 may also be formed in any other desired manner as, for example, from an ordinary grey iron casting which may be machined and finished as desired.

Other changes may be made in the construction herein shown constituting the preferred embodiment of the present invention such, for example, as a substitution of other types of set screws for the Allen set screw here shown, the provision of cutter blades formed from other than circular rod stock and the like without departing from the spirit of the present invention.

I claim:

A rotary cutter head comprising a spindle, a solid disk-shaped body member secured thereto and comprising a unitary disk having a depending member formed centrally thereof and adapted to form a stop and control the depth of cut, an outwardly and upwardly slanting peripheral surface on the bottom of said body member surrounding said depending guide member and adapted to deflect cut chips and particles downwardly and outwardly from said head, a top portion supported by said spindle and a plurality of angularly extending openings each having one end terminating in said peripheral surface, a plurality of cutter blades secured one in each of said openings and having a cutting end portion maintained in position to contact and undercut an unfinished surface of the work piece, means for adjusting a blade in predetermined position in each of said openings and comprising a set screw screw-threaded in an opening extending through the side of each of said openings and adapted to contact a side of the blade to prevent axial displacement of said blade relative to said body.

HENRY J. BERRY.